US006292475B1

(12) United States Patent
Swail

(10) Patent No.: US 6,292,475 B1
(45) Date of Patent: Sep. 18, 2001

(54) FLOW INITIATED BURST MODE COMMUNICATION FOR WIRELESS COMMUNICATION NETWORK SYSTEMS AND METHOD

(75) Inventor: Bruce Dawson Swail, Barrington, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/112,271

(22) Filed: Jul. 8, 1998

(51) Int. Cl.$^7$ ....................................................... H04Q 7/00
(52) U.S. Cl. .......................... 370/329; 370/338; 370/229
(58) Field of Search ................................... 370/328, 329, 370/335, 336, 337, 338, 342, 343, 344, 345, 347, 229; 455/422, 432, 450

(56) References Cited

U.S. PATENT DOCUMENTS 5,933,420 * 8/1999 Jaszewski et al. ................... 370/329
5,960,344 * 9/1999 Mahany ................................. 455/432
6,188,681 * 2/2001 Vesuna ................................. 370/338

* cited by examiner

Primary Examiner—Min Jung
(74) Attorney, Agent, or Firm—Terri S. Hughes

(57) ABSTRACT

An access point (10) monitors traffic flows of communication on a first communication channel (20) between nodes (12, 14, 16) of the wireless communication network system. The access point (10) directs a first node (12) and a second node (14) to a second communication channel (22) when the traffic flow between the first node (12) and the second node (14) reaches a first predetermined level. The first node (12) and the second node (14) utilize the second communication channel (22) to convey information between the first node (12) and the second node (14). The first node (12) and the second node (14) monitor traffic flow between the first node (12) and the second node (14) on the second communication channel (22) and return to the first communication channel (20) when the traffic flow between the first node (12) and the second node (14) on the second communication channel (22) falls below a second predetermined level.

14 Claims, 2 Drawing Sheets

FLOW INITIATED BURST MODE COMMUNICATION FOR WIRELESS COMMUNICATION NETWORK SYSTEMS AND METHOD

FIELD OF THE INVENTION

The present invention relates to flow initiated burst mode communication for wireless communication network systems and method.

BACKGROUND OF THE INVENTION

Present wireless communication network systems typically employ an access point to coordinate transmission from a plurality of nodes in the system. The access point allocates the usage of spectrum across the system. In most cases, each message from a node is sent to the access point and then repeated to the destination node. Thus, each message from a node consumes two units of spectrum/time resource for each message. Moreover, applications become communication link aware and undermine protocol layering within the system.

Thus, a need exists for an automated, demand driven method to initiate parallel burst mode communication for a wireless communication network system.

BRIEF DESCRIPTION OF THE DRAWINGS

A preferred embodiment of the present invention is now described, by way of example only, with reference to the accompanying drawings in which.

DETAILED DESCRIPTION OF THE PREFERRED EMBODIMENT

The present invention provides an automated, demand driven method to initiate parallel burst mode communication for a wireless communication network system. The present invention allows increasing of the system capacity by spawning a second orthogonal communication channel/ bandwidth for the direct communication of two nodes of the communication system. The term "orthogonal", as applied to two communication channels, is a term commonly used in the art and means, without particular limitation, non-correlated or mutually exclusive. Spawning a second orthogonal communication channel has the dual effect of lessening the demand load on a first communication channel and offering a high capacity bandwidth to the two nodes to exhaust the demand flow.

In the present invention, frequency hopping spread spectrum technology, as described in Bernard Sklar, DIGITAL COMMUNICATIONS Fundamentals and Applications, pages 555–562 (1988) and incorporated herein by reference, is used to provide a reliable wireless communication link in an unlicensed, shared portion of spectrum (2.4 GHz). Nodes periodically hop to a new frequency bandwidth within the band of operation to avoid interference and to satisfy Federal Communications Commission (FCC) regulations for energy spreading across the entire band. Since the nodes operate on pseudo-random frequency hopping patterns, it is possible to devise multiple orthogonal pseudo-random frequency hopping patterns. Such orthogonal sets allow simultaneous operation of communication equipment geographically co-located with each other. Alternatively, nodes using frequency hopping spread spectrum access protocols may synchronize with each other and use the identical pseudo-random hopping pattern, but use a unique index into the hopping pattern on a per-node basis.

Figure 1:
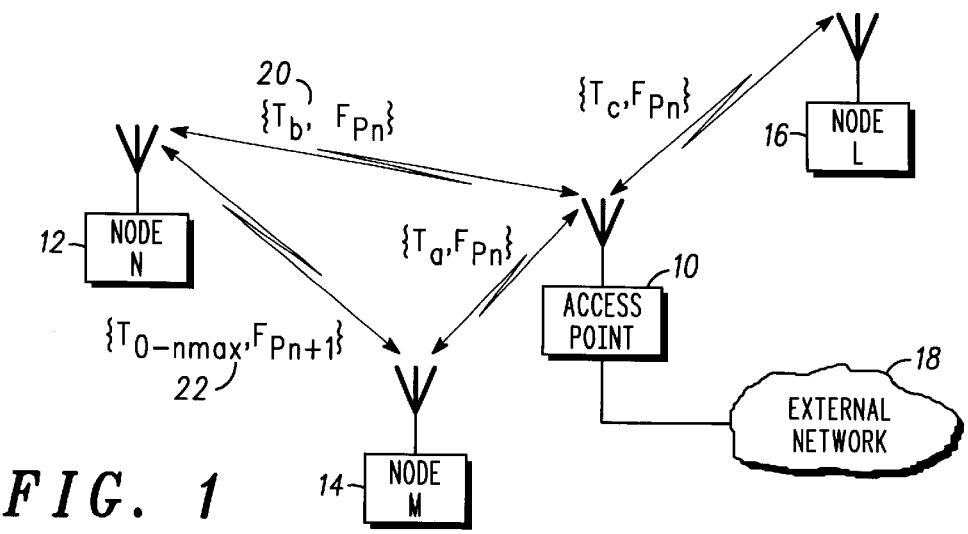
FIG. 1 is a diagram of a wireless communication network system according to a preferred embodiment of the present invention.

FIG. 1 is a representative diagram of a wireless communication network system. The representative wireless communication network system comprises an access point 10, a node N 12, a node M 14, a node L 16 and an external network 18. A wireless communication network system can be managed by a single controlling element referred to as the access point 10. The access point 10 is an intelligent device that coordinates communication among several, simpler, end-user access devices or nodes. Placing the intelligence in the access point 10 allows the more plentiful node elements to be produced at a lower cost of manufacture.

Figure 2:
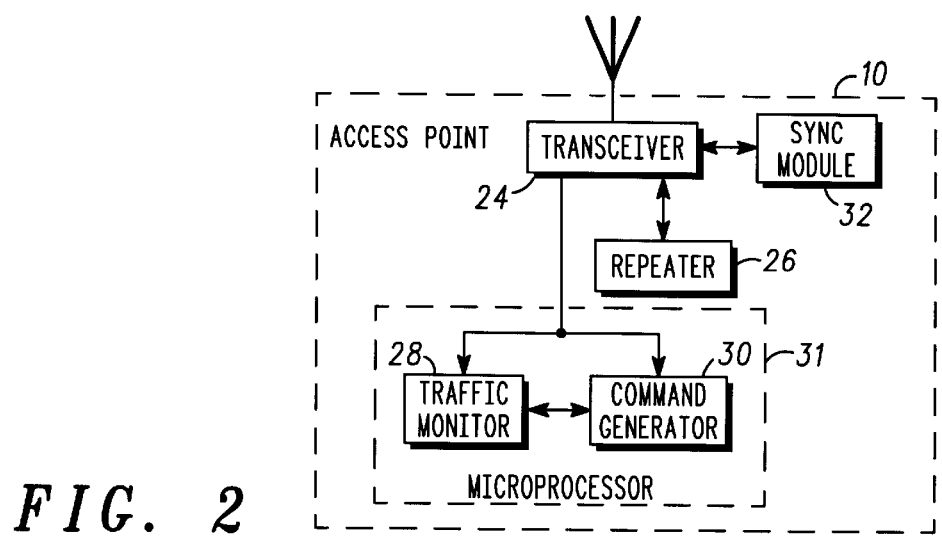
FIG. 2 is a block diagram of an access point according to the preferred embodiment of the present invention.

As shown in FIG. 2, the access point 10 comprises a transceiver 24 (which is made up of separate transmitter and receiver components), a repeater 26, a traffic monitor 28 and a command generator 30, wherein the traffic monitor 28 and the command generator 30 are embedded in software on a microprocessor 31. The access point 10 may also comprise a synchronization module 32. The access point 10 functions as a local controller administering communication between nodes N 12, M 14 and L 16. The access point 10 also acts as a gateway from these nodes to the external network 18.

The transceiver 24 transmits and receives data/ message traffic from the plurality of nodes 12, 14, 16 over a first communication channel $F_{pn}$ 20 (i.e., a common pseudo-random frequency hopping pattern).

The repeater 26 is coupled to the transceiver 24. The repeater 26 regenerates the data/message traffic received from a first node 12 (e.g., node N) and transmits the data/message traffic to a second node 14 (e.g., node M).

The traffic monitor 28 is also coupled to the transceiver 24. The traffic monitor 28 monitors traffic flows on the first communication channel 20 (e.g., $F_{Pn}$) between the plurality of nodes 12, 14, 16 on the wireless communication network system.

The command generator 30 is coupled to the traffic monitor 28 and the transceiver 24. The command generator 30 allocates a second orthogonal communication channel 22 (e.g., $F_{Pn}+1$) for the first node 12 and the second node 14 to allow the first node 12 and the second node 14 to communicate directly without intervention from the access point 10.

The synchronization module 32 is coupled to the transceiver 24. The synchronization module 32 allows the access point 10 to follow the first communication channel $F_{Pn}$ 20 over which a pseudo-random frequency-hopping pattern takes place.

Figure 3:
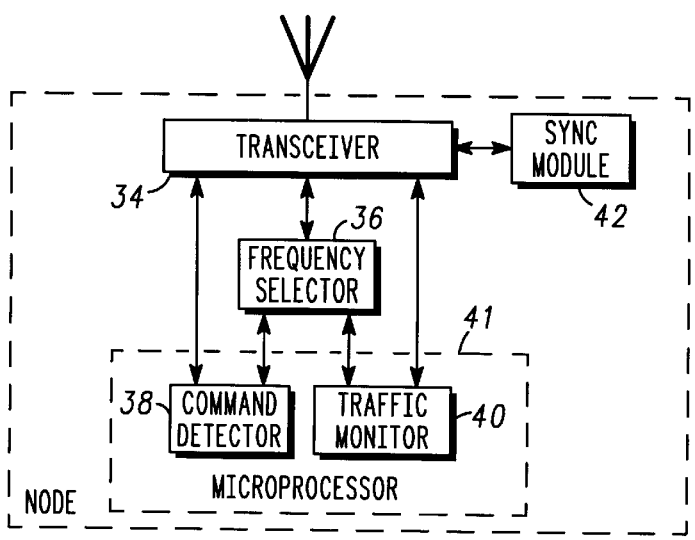
FIG. 3 is a block diagram of a node according to the preferred embodiment of the present invention.

As shown in FIG. 3, each node 12 comprises a transceiver 34, a frequency selector (e.g., a synthesizer) 36, a command detector 38 and a traffic monitor 40, wherein the command detector 38 and the traffic monitor 40 are embedded in software on a microprocessor 41. Each node 12 can also comprise a synchronization module 42.

The transceiver 34 transmits and receives data/message traffic to and from the access point 10 when communicating over the first communication channel 20 (e.g., $F_{Pn}$). The transceiver 34 also transmits and receives data/message traffic to and from another node 14 when communicating over the second orthogonal communication channel 22 (e.g., $F_{Pn}+1$).

The frequency selector 36 is coupled to the transceiver 34. The frequency selector 36 selects a hopping index into the pseudo-random hopping pattern based on whether the node is transmitting or receiving data/message traffic.

The command detector 38 is coupled to the transceiver 34 and the frequency selector 36. The command detector 38 detects commands from the access point 10 to cease communication over the first communication channel $F_{Pn}$ 20 and start communication over the second orthogonal communication channel $F_{Pn}+1$ 22.

The traffic monitor 40 is coupled to the transceiver 34 and to the frequency selector 36. The traffic monitor 40 monitors the traffic flow on the second orthogonal communication channel 22.

The synchronization module 42 is coupled to the transceiver 34. The synchronization module 42 allows each node to follow a pseudo-random frequency hopping pattern. Thus, when node N 12, node M 14, node L 16 and the access point 10 are synchronized, they all follow the first communication channel $F_{Pn}$ 20 over which a pseudo-random frequency-hopping pattern takes place.

Access to the first communication channel $F_{Pn}$ 20 is offered in discrete timeslots $T_n$ in a time division duplex (TDD) protocol. For example, $\{T_b, F_{Pn}\}$, as shown in FIG. 1, refers to timeslot b of a TDD data stream on frequency hopping communication channel $P_n$ 20. Nodes may request single or multiple slots as dictated by the data/message traffic volume and bandwidth required. Since a physical spectrum has a finite bandwidth and the slots $T_n$ are finite, the available bandwidth to the nodes is limited to this discrete and limited amount. As nodes grow in number on this wireless communication network system, the finite bandwidth gets shared across more nodes and may ultimately constrain operation of the wireless communication network system with unacceptable time delays.

In its preferred embodiment, the present invention sheds some of this network loading by directing traffic flows between nodes to the second orthogonal communication channel $F_{Pn}+1$ 22 on a different physical spectrum from the first communication channel $F_{Pn}$ 20 over which frequency hopping takes place. Diverting the traffic flow to the second orthogonal communication channel has advantages. First, the available bandwidth consumed on the first communication channel $F_{Pn}$ 20 is returned to the system for use by the access point 10 and other nodes, such as node L 16. Second, the nodes which move to the newly available bandwidth resource of the second orthogonal communication channel $F_{Pn}+1$ 22 will now communicate directly with each other, thus eliminating the two hop communication needed when an access point 10 is employed in the system. Finally, node N 12 and node M 14 will access all of the TDD timeslots, $T_{o-nmax}$, on the second orthogonal communication channel $F_{Pn}+1$ 22, thereby having the entire available bandwidth of the orthogonal communication channel to exhaust the demand (i.e., $\{T_{o-nmax}, F_{Pn}+1\}$). In effect, node N 12 and node M 14 minimally see a doubling in available bandwidth to them while the access point 10 and node L 16 see no diminished system resources to them as the traffic flow between node N 12 and node M 14 is communicated over the second orthogonal communication channel $F_{Pn}+1$ 22.

In its preferred embodiment, the present invention also provides for the automatic establishment and spawning of the second orthogonal communication channel $F_{Pn}+1$ 22 on a different pseudo-random frequency hopping index from the first communication channel $F_{Pn}$ 20 for direct communication between selected nodes. Rather than having additional commands and application awareness of the communication link, the system spawns demand communication channels directly and automatically. Spawning orthogonal communication channels are initiated by logic within the access point 10. The access point 10 routinely monitors traffic flows between nodes of the wireless communication network system. When a traffic flow of level x is sustained over time period y, the access point 10 intervenes and directs node N 12 and node M 14 to the second orthogonal communication channel $F_{Pn}+1$ 22. Once the nodes synchronize on the second orthogonal communication channel $F_{Pn}+1$ 22, they have access to the entire available bandwidth and can use the capacity to quickly communicate the flow.

Figure 4:
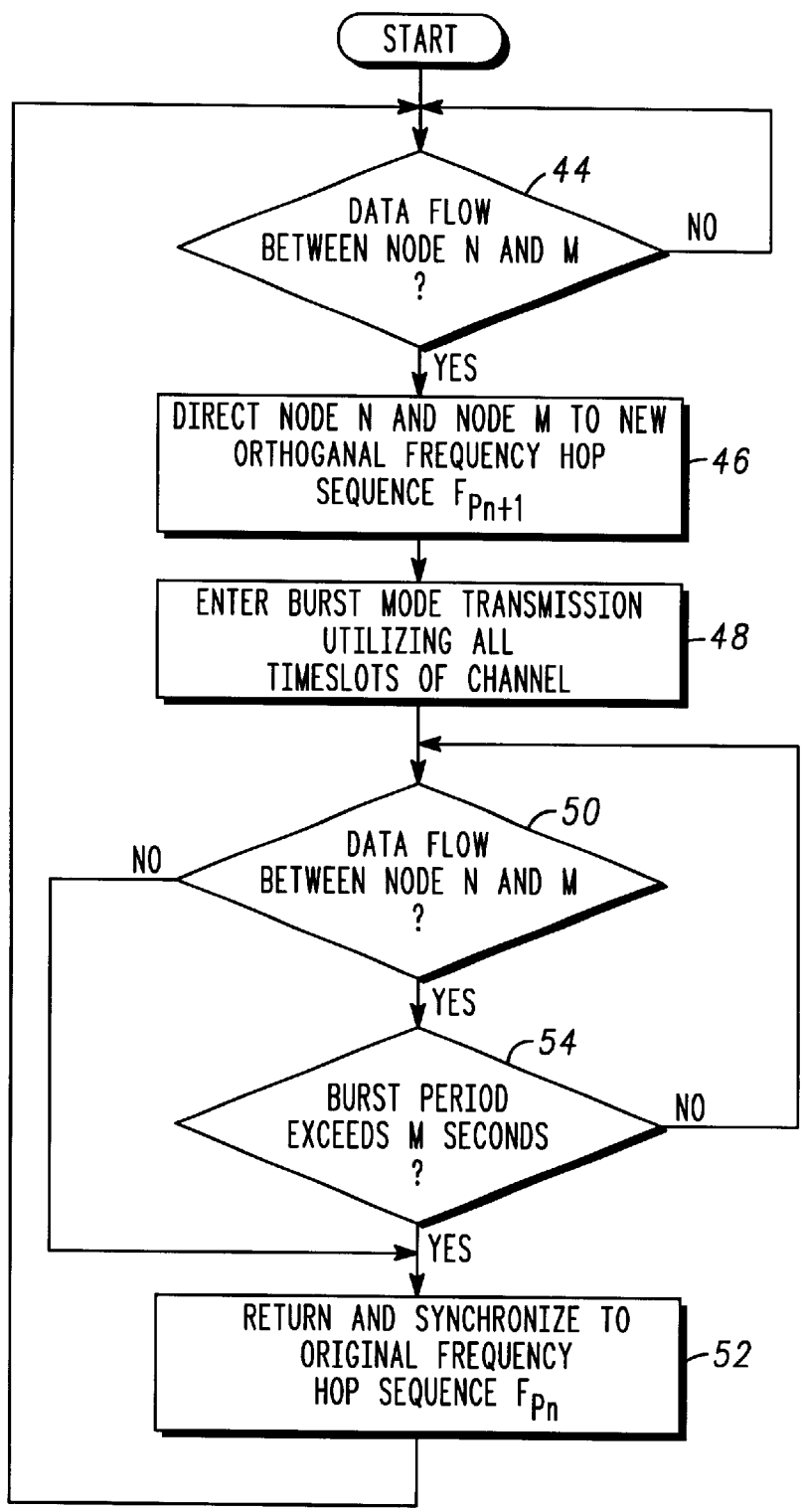
FIG. 4 is a logic flow diagram for intervention and termination of a burst mode according to the preferred embodiment of the present invention.

Thus, as shown in FIG. 4, the access point 10 determines if there is message traffic between nodes N 12 and M 14 at decision step 44. If the answer to decision step 44 is no, then nodes N 12 and M 14 continue to communicate over the first communication channel 20 via the access point 10. If the answer to decision step 44 is yes, then the access point 10 directs node N 12 and node M 14 to a second orthogonal communication channel $F_{Pn}+1$ 22 at step 46. Once node N 12 and node M 14 are directed to the second orthogonal communication channel $F_{Pn}+1$ 22, a burst mode transmission is entered utilizing all timeslots of the frequency hopping index at step 48. Node N 12 and node M 14 monitor their traffic flow on the second orthogonal communication channel $F_{Pn}+1$ 22 and determine if the data/message traffic flow between node N 12 and node M 14 is still active at decision step 50. If the answer to decision step 50 is no, node N 12 and node M 14 return and synchronize to the first communication channel $F_{Pn}$ 20 at step 52 and repeat the process starting at step 44. If the answer to decision step 50 is yes, node N 12 and node M 14 determine if the burst period exceeds m seconds at decision step 54. If the answer to decision step 54 is no, node N 12 and node M 14 determine again whether the data flow between node N 12 and node M 14 is still active at decision step 50. If the answer to decision step 54 is yes, node N 12 and node M 14 return and synchronize to the first communication channel $F_{Pn}$ 20 at step 52 and repeat the process starting at step 44.

While in direct communication mode, node N 12 and node M 14 will monitor for inactivity. If the traffic flow between the nodes falls below level z over period y, node N 12 and node M 14 will return to the first communication channel $F_{Pn}$ 20. To avoid losing contact with the access point 10, and missing unsolicited traffic, the node N 12 and node M 14 will also keep track of time since they were last synchronized with the access point 10. If a time period of m seconds elapses, nodes 12, 14 will terminate their direct communication activity and return to the first communication channel $F_{Pn}$ 20. Once the nodes 12, 14 have returned to the first communication channel $F_{Pn}$ 20, nodes N 12 and M 14 will accept new traffic from other nodes (e.g., node L 16) or recommence the original flow between each other which will cause the spawning of a new burst session.

While the invention has been described in conjunction with a specific embodiment thereof, additional advantages and modifications will readily occur to those skilled in the art. For example, although the preferred embodiment describes a slow frequency hopping spread spectrum protocol with TDD, a time division multiple access (TDMA) protocol (e.g., wherein the first communication channel and the second communication channel each occupy a unique time slot in a TDMA protocol), a frequency division multiple access (FDMA) protocol (e.g., wherein the first communication channel and the second communication channel each occupy a unique physical spectrum in a FDMA protocol), a direct sequence-code division multiple access (DS-CDMA) protocol (e.g., wherein the first communication channel and the second communication channel are uniquely spread via sufficiently maximal-length pseudo-random number spreading sequences in a DS-CDMA protocol), or a coded-orthogonal frequency division multiple access (C-OFDM) protocol (e.g., wherein the first communication channel and the second communication channel each occupy a unique time and sub-carrier frequency resource in C-OFDM protocol) are also within the scope of the present invention. Additionally, duplexing may be with either TDD or with frequency division duplex (FDD). It should be noted that these protocols can be interchanged in various combinations. Any of the above listed means of obtaining an orthogonal communication channel are within the scope of the invention.

The remaining message traffic between other nodes in the system remain operational on the first communication channel they existed on in parallel to the message traffic on the second orthogonal communication channel.

The invention, in its broader aspects, is therefore not limited to the specific details, representative apparatus and illustrative examples shown and described. For example, although the preferred embodiment describes the second communication channel as being "orthogonal" to the first communication channel, it is well within the scope of the present invention for the second communication channel to be "non-orthogonal" to the first communication channel. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

I claim:

1. A method for a flow initiated burst mode communication for a wireless communication network system comprising:
   at an access point:
      monitoring traffic flows of communication on a first communication channel between nodes of the wireless communication network system;
      directing a first node and a second node to a second communication channel when traffic flow between the first node and the second node reaches a first predetermined level;
   at the first node and the second node:
      utilizing the second communication channel to convey baseband information between the first node and the second node;
      monitoring traffic flow between the first node and the second node on the second communication channel; and
      returning to the first communication channel when the traffic flow between the first node and the second node on the second communication channel falls below a second predetermined level.

2. The method according to claim 1 wherein the first communication channel and the second communication channel are uniquely spread via sufficiently maximal-length pseudo-random number spreading sequences in a direct sequence code division multiple access (DS-CDMA) protocol.

3. The method according to claim 1 wherein the first communication channel and the second communication channel each occupy a unique time slot in a time division multiple access (TDMA) protocol.

4. The method according to claim 1 wherein the first communication channel and the second communication channel each occupy a unique physical spectrum in a frequency division multiple access (FDMA) protocol.

5. The method according to claim 1 wherein the first communication channel and the second communication channel each occupy a unique time and sub-carrier frequency resource in a coded-orthogonal frequency division multiplexing (C-OFDM) protocol.

6. The method according to claim 1 wherein the traffic flow between the first node and the second node over the first communication channel takes places via the access point.

7. The method according to claim 1 wherein the first predetermined level is sustained for a predetermined time period.

8. The method according to claim 1 wherein the second predetermined level is sustained for a predetermined time period.

9. The method according to claim 1 further comprising, at the first node and the second node, monitoring an amount of time since last synchronized with the access point.

10. The method according to claim 9 further comprising:
   terminating use of the second communication channel if a predetermined time period elapses since last synchronized with the access point; and
   returning to the first communication channel.

11. A wireless communication network system for a flow initiated burst mode communication for a wireless communication network system having an access point, a plurality of nodes and an external network, wherein the access point functions as a local controller administering communication between the plurality of nodes and acts as a gateway from the plurality of nodes to the external network, the access point comprising:
   a transceiver for transmitting and receiving data from the plurality of nodes;
   a repeater, coupled to the transceiver, for regenerating the data received from a first node and transmitting the data to a second node;
   a traffic monitor, coupled to the transceiver, for monitoring traffic flows of communication on a first communication channel between the plurality of nodes on the wireless communication network system; and
   a command generator, coupled to the traffic monitor and the transceiver, for allocating a second communication channel to the first node and the second node to allow the first node and the second node to communicate directly without intervention from the access point.

12. The wireless communication network system according to claim 11 further comprising a synchronization module, coupled to the transceiver, for allowing the access point to follow a pseudo-random frequency hopping pattern.

13. A wireless communication network system for a flow initiated burst mode communication for a wireless communication network system having an access point, a plurality of nodes and an external network, wherein the access point functions as a local controller administering communication between the plurality of nodes and acts as a gateway from the plurality of nodes to the external network, each node comprising:
   a transceiver for transmitting and receiving data to and from the access point when communicating over a first communication channel and transmitting and receiving data to and from another node in the wireless communication network system when communicating over a second communication channel;

a frequency selector, coupled to the transceiver, for selecting a hopping index into a pseudo-random hopping pattern based on whether a node is transmitting or receiving data;

a command detector, coupled to the transceiver and the frequency selector, for detecting commands from the access point to cease communication over a first communication channel and begin communication over the second communication channel; and a traffic monitor, coupled to the transceiver and the frequency selector, for monitoring a traffic flow on the second communication channel.

14. The wireless communication network system according to claim 13 further comprising a synchronization module, coupled to the transceiver, for allowing each node to follow a pseudo random frequency hopping pattern.

* * * * *